United States Patent Office 3,557,279
Patented Jan. 19, 1971

3,557,279
MICROENCAPSULATION FORM OF AN
ANTI-INFLAMMATORY DRUG
Lewis D. Morse, Princeton, N.J., assignor to Merck & Co.,
Inc., Rahway, N.J., a corporation of New Jersey
No Drawing. Filed June 12, 1969, Ser. No. 832,844
Int. Cl. A61j 3/07; A61k 27/12
U.S. Cl. 424—20                        7 Claims

ABSTRACT OF THE DISCLOSURE

The anti-inflammatory drug indomethacin is microencapsulated by the method of polymer/polymer incompatibility, coacervation using either an ethylcellulose-polyethylene system or a gelatin-gum arabic system.

---

This invention relates to pharmaceutical preparations and particularly to a method of and a product for controlling the release of indomethacin which is orally inconsumed. More particularly the invention provides an oral domethacin preparation which will prolong the release of the medicine after consumption.

Indomethacin is disclosed in U.S. Pat. 3,161,654 and chemically is 1-(p-chlorobenzoyl)-5-methoxy-2-methyl-indole-3-acetic acid. It is generally prescribed because of its exceptional activity as an anti-inflammatory analgesic and/or antipyretic agent and it has particular utility in the treatment of arthritic conditions. Efforts have been made to slow up its release in the gastro-intestinal system, not only to prolong its therapeutic action but also to minimize its possible tendency to ulcerate the gastrointestinal mucosa if it is present at a particular spot in a large concentration. Efforts have been made in the past to devise a dosage form which will prolong the release of the indomethacin but they have not been successful.

In accordance with the present invention, an oral dosage form of indomethacin is provided which yields the drug over an extended period of time in small increments. This result is achieved by enclosing the indomethacin particles in micro-capsules. These very small capsules have a different permeability and consequently some of them release the contained indomethacin quickly whereas others release the drug at intervals over the ensuing time period which may be three or four hours.

The microencapsulation of the indomethacin involves the known arts of polymer/polymer incompatibility, coacervation, and film formation from polymer solutions by loss of solvent. Representative of this prior art are the British Pat. 1,016,839, and the U.S. Pats. 3,155,590 and 2,800,457. The present invention involves the adaptation of those processes and the resulting products to the problem of microencapsulating indomethacin.

The invention includes both water insoluble coating polymers as illustrated by Examples 1 to 10 and water soluble coating polymers as represented by Examples 11 and 12. The water insoluble coatings can be made so that individual batches have a fairly distinct release time interval and this makes it possible to selectively combine the products from different batches so that there are present in a single dosage (e.g. a single tablet) microcapsules which release the indomethacin at successive intervals. The tablets containing the microcapsules having water soluble coatings will differ enough among themselves so that a gradual release of the indomethacin results but this does not lend itself to the prolonged release made possible by water insoluble coatings. In either case, the microencapsulater may be contained in the usual pharmaceutical capsules so that one or two capsules gives a unit dose, or the microencapsulater may be put into a tablet form by using conventional methods.

For the water insoluble coating a suitable solvent is cyclohexane. The ethylcellulose should preferably have a 47.5% ethoxyl content and a 100 cps. viscosity but a range of 45.0–50% ethoxyl content and a 95–110 cps. viscosity is permissible. The viscosity is measured as known in the art, at 25° C. as a 5% by weight solution in a 80:20 toluene-ethanol mixture. On the basis of 100 grams of cyclohexane there can be added 1 to 5 grams of the ethylcellulose to thereby vary the time of release of the indomethacin.

The polyethylene preferably used should have a molecular weight of between 5000 to 10,000 (an average of 7000 is preferred) and from 1 to 5 grams of it should be added per 100 grams of the cyclohexane. The invention also contemplates the possible addition of polyethylene glycol in the 3000–3700 molecular weight range within the variation of 0–30 grams based on 100 grams of cyclohexane. This low molecular weight polyethylene glycol is preferably added in a molten state. It may be added over this wide range to obtain wider different indomethacin release time.

The indomethacin preferably is microatomized so that 98% of it is only a few microns in size but this is by no means essential as the indomethacin particles may range up to mostly be of a U.S. No. 20 gauge sieve size. To obtain a wide variation in its release time it may be added over a wide range, namely from 0.5 to 40 grams based on 100 grams of cyclohexane. It may for convenience be added to the molten low molecular weight of polyethyleneglycol mentioned above if this latter is used.

The following examples are representative of the invention.

EXAMPLE 1

The following were dispersed in 300 gm. cyclohexane, using an upthrust turbine impeller:

|  | Gm. |
|---|---|
| Ethylcellulose (47.5% ethoxyl content by weight; viscosity 100 cps. as measured above) | 6 |
| Polyethylene granules (molecular weight about 7000) | 6 |
| Indomethacin, microatomized | 2 |

Stir the system with heating. At 80° C. both the ethylcellulose and the polyethylene had dissolved in the cyclohexane.

Stirring was continued while the system was allowed to cool. As the temperature dropped, solvated ethylcellulose developed as a separate phase due to the presence of the polyethylene. The solvated polyethylene, distributed in the cyclohexane as droplets by the turbine, tended to wet the indomethacin particles and to envelope them. As the temperature dropped further, the ethylcellulose lost solvent and developed into solid encapsulating walls. The continuous phase, cyclohexane, contained minute particles of polyethylene. At 45° C. the walls had stopped building up. Cold cyclohexane was added to reduce the temperature still further. The supernatant cyclohexane was poured off together with the minute particles of polyethylene. The microcapsules were resuspended in clean, cyclohexane. This was continued until the capsules were washed clean of polyethylene and other debris. The capsules were spread to dry.

The resultant capsules, with a 25% indomethacin content, when screened through standard Taylor sieves, were—

| Mesh size: | Wt. percent |
|---|---|
| +20 | 27.2 |
| −20/+50 | 29.3 |
| −50/+100 | 22.4 |
| −100 | 21.1 |

Dispersed in simulated gastric fluid, the capsules pick up liquid by diffusion. The internal phase is leached out gradually.

EXAMPLE 2

Capsules were prepared successfully, as in Example 1, but 6 gm. indomethacin was used. The resultant capsules with a 50% indomethacin content had a screen analysis as follows.

| Mesh size: | Wt. percent |
|---|---|
| +20 | 5.1 |
| −20/+50 | 21.0 |
| −50/+100 | 34.7 |
| −100 | 39.2 |

These capsules in simulated gastric fluid yielded indomethacin gradually.

EXAMPLE 3

Capsules were prepared successfully, as in Example 1, but 18 gm. indomethacin was used. The resultant capsules with a 75% indomethacin content had the following screen analysis.

| Mesh size: | Wt. percent |
|---|---|
| +20 | 4.3 |
| −20/+50 | 15.5 |
| −50/+100 | 48.5 |
| −100 | 31.7 |

These, too yielded indomethacin gradually in simulated gastric fluid.

By blending capsules from Examples 1, 2, and 3 in various proportions, one can achieve variations in overall release characteristics in simulated gastric fluid. This results from varying combinations of capsule wall thickness. Thus, the medicinal effect can be adjusted to various requirements.

EXAMPLE 4

Capsules were prepared successfully as in Example 1, but—
(a) 110 gm. indomethacin was used.
(b) The indomethacin was added only after the polymer/cyclohexane system had reached 80° C.

The resultant capsules with a 95% indomethacin content had a screen analysis as follows.

| Mesh size: | Wt. percent |
|---|---|
| +42 | 4.6 |
| −42/+80 | 9.3 |
| −80/+100 | 9.1 |
| −170/+170 | 50.2 |
| −170/+270 | 26.1 |
| −270 | 0.8 |

The internal phase is released gradually in simulated gastric fluid.

EXAMPLE 5

Capsules were prepared successfully as in Example 1, but—
(a) 12 gm. indomethacin was used.
(b) 115 gm. polyethylene glycol (average molecular weight 3000 to 3700) was added.

The process proceeded as in Example 1, but at about 50° C. viscosity increased as the glycol started to melt. The system turned yellow as indomethacin started to dissolve in the glycol. When all the glycol had melted, the viscosity of the system returned to the original low order.

The resultant capsules were beadlets of solidified polyethylene glycol entraining indomethacin, each beadlet coated with a film of ethylcellulose.

Slower release in simulated gastric fluid resulted from this treatment. Capsule content: 86.5% glycol, 9.0% indomethacin.

EXAMPLE 6

Capsules were prepared successfully as in Example 5, but—
(a) 24 gm. polyethylene glycol (average molecular weight 3,000 to 3,700).
(b) 2.5 gm. indomethacin.

The resultant capsules had internal phase contents of 73.4% glycol and 7.7% indomethacin.

EXAMPLE 7

Microcapsules were prepared as in Example 5, but—
(a) 40 gm. polyethylene glycol (average molecular weight 3,000 to 3,700).
(b) 4.2 gm. indomethacin.

The resultant capsules had internal phase contents of 79.7% glycol and 8.4% indomethacin.

By blending capsules from Examples 5, 6, and 7 in various proportions, one can achieve variations in overall release characteristics in simulated gastric fluid.

EXAMPLE 8

The following were dispersed in 300 gm. cyclohexane using an upthrust turbine impeller:

| | Gm. |
|---|---|
| Ethylcellulose (as in Example 1) | 6 |
| Polyethylene (as in Example 1) | 6 |

With stirring and at 80° C., added 78.4 gm. molten polyethylene glycol (3000 to 3,7000 molecular weight) in which 36.3 gm. indomethacin had been dispersed. Proceed as in Example 1.

The resultant microencapsulated beadlets have a much higher indomethacin content than those of Examples 5, 6 and 7. Even though the solubility of indiomethacin in the glycol has been exceeded, the indomethacin stays in the glycol as a dispersed phase.

The resultant capsules had an internal phase content of 65.0% glycol, 30.1% indomethacin. Most of the capsules were in the −12/+16 mesh range.

EXAMPLE 9

Same as Example 8, but—
(a) 26 gm. Polyethylene glycol, (average molecular weight 3,000 to 3,700).
(b) 14 gm. indomethacin.

Resultant capsules had an internal phase content of 56.5% glycol and 30.4% indomethacin. Most of the capsules were in the −20/+35 mesh range.

EXAMPLE 10

Same as Example 8, but—
(a) 15 gm. polyethylene glycol (average 3000 to 3,700 molecular weight).
(b) 9 gm. indomethacin.

Resultant capsules had an internal phase content of 50% glycol and 30% indomethacin. Most of the capsules were in the −28/+100 mesh range.

Blending the microcapsules of Examples 8, 9, and 10 in various proportions provided variation in overall release rate of indomethacin in simulated gastric fluid.

The above examples employed coating polymers that are insoluble in water. Release from the microcapsules depended upon water diffusing into the capsule and leaching out internal phase.

The following examples employ water soluble polymers. Release from these capsules depends only very slightly upon diffusion. Gelatin in the capsular material is hydrolyzed in simulated gastric juice; internal phase is thus released.

EXAMPLE 11

An 11% solution of 250 Bloom porkskin gelatin in distilled water was prepared (I) and held at 55° C. An 11% solution of gum arabic in distilled water was prepared (II) and held at 55° C.

90 ml. of (I), 90 ml. of (II) and 350 ml. distilled water (previously warmed to 55° C.) were blended and kept stirring with a flat bladed impeller. Microscopic examination of this blend (III) showed an essentially clear liquid. The pH of III was adjusted to 4.5 with 10% aqueous acetic acid. Microscopic examination now showed a rich dispersion of coacervate droplets of gelatin/gum arabic in water. The dispersion of the highly hydrated protein-gum complex was kept stirring, and allowed to cool to 40° C. At that temperature 54 gm. indomethacin was added. The system was allowed to cool slowly. At 38° C. microscopic examination showed that coacervate droplets were wetting small aggregates of indomethacin particles. The coacervate droplets fused together to form a hydrated film. As the temperature dropped to 25° C., wall build-up continued. At 25° C. there were discrete microcapsules of aggregated indomethacin particles. The system was chilled to 10° C. and 4.5 ml. of 25% aqueous glutaraldehyde was added to crosslink the capsular wall material. The system was allowed to stir overnight. The capsules were washed with chilled, distilled water and air dried.

The resultant capsules were frangible clumps containing 75% indomethacin. They released indomethacin gradually in simulated gastric fluid.

EXAMPLE 12

Same as Example 11, but as internal phase use 25 gm. indomethacin dispersed in 150 gm. paraffin oil, U.S.P. (Fisher Cat. No. 0-120). The paraffin oil contained also 7.5 gm. surfactant, mono and diglycerides of fat forming fatty acids (Atlas' Atmos® 300).

The resultant capsules had an internal phase content of 91%. The indomethacin content was 58%. The microcapsules were in two main size ranges, 100µ to 200µ and 500µ to 1500µ. They release indomethacin gradually in simulated gastric fluid.

What is claimed is:

1. An oral dosage form of indomethacin which yields a predetermined unit dosage level of the drug, or predetermined fractional dosage thereof, over an extended period of time in small increments from a plurality of micro-capsules (a) and (b) having coatings with different permeabilities, (a) at least some of them releasing the contained indomethacin quickly from watersoluble polymer-coated micro-capsules, whereas others (b) release the drug at intervals over the ensuing time period from water-insoluble polymer-coated micro-capsules, said (a) water soluble polymer-coated micro-capsules being made so that individual different batches differ enough among themselves so that a gradual release of the drug results, said (b) water insoluble polymer-coated micro-capsules being made so that individual different batches having fairly distinct releast time intervals are selectively combined for prolonged release of the drug at successive intervals, said controlled release oral pharmaceutical preparation of indomethacin being prepared in accordance with the method which comprises microencapsulating indomethacin particles by incompatability coacervation from a system selected from the group consisting of an ethyl cellulose-polyethylene cyclohexane water-insoluble polymer coating or encapsulating solution and a gelatingum arabic cyclohexane water-soluble polymer coating or encapsulating solution and combining microencapsules of each system into a single dosage unit.

2. The preparation according to claim 1 in which the ethylcellulose-polyethylene solution is in cyclohexane containing 1 to 5 grams of ethylcellulose having a 45.0-50% ethoxyl content and a 95–110 cps. viscosity, and 1 to 5 grams of polyethylene having a molecular weight between 5000 to 10,000, in 100 grams of the cyclohexane.

3. The preparation method of claim 1 in which the ethylcellulose-polyethylene solution is in cyclohexane containing 2 grams of ethylcellulose having a 47.5% ethoxyl content and a 100 cps. viscosity, and 2 grams of polyethylene having an average molecular weight of 7000, in 100 grams of the cyclohexane.

4. The preparation according to claim 1 in which the ethylcellulose-polyethylene solution is in cyclohexane containing 1 to 5 grams of ethylcellulose having a 45.0-50% ethoxyl content and a 95–110 cps. viscosity, and 1 to 5 grams of polyethylene having a molecular weight between 5000 to 10,000, in 100 grams of the cyclohexane, and also containing 0-30 grams of polyethylene glycol in the molecular weight range of 3000 to 3700.

5. The preparation of claim 1 in which the indomethacin is in microatomized form so that 98% of it is only a few microns in size.

6. The preparation of claim 1 in which the gelatin-gum arabic solution is in water containing, per 350 ml. of the water, 90 ml. of a 11% water solution of 250 Bloom porkskin gelatin and 90 ml. of a 11% water solution of the gum arabic.

7. The preparation of claim 1 in which the gelatin-gum arabic solution is in water containing, per 350 ml. of water, 90 ml. of a 11% water solution of 250 Bloom porkskin gelatin and 90 ml. of a 11% water solution of the gum arabic, and, as an internal phase in said solution, a dispersion of paraffin oil, a surfactant and the indomethacin.

References Cited

UNITED STATES PATENTS

| | | | |
|---|---|---|---|
| 2,800,457 | 7/1957 | Green et al. | 252—316 |
| 2,800,458 | 7/1957 | Green et al. | 252—316 |
| 3,139,383 | 6/1964 | Neville | 424—35X |
| 3,155,590 | 11/1964 | Miller et al. | 252—316X |
| 3,161,602 | 12/1964 | Herbig et al. | 252—316 |
| 3,341,416 | 9/1967 | Anderson et al. | 424—35X |
| 3,461,208 | 8/1969 | Winter | 424—274X |
| 3,488,418 | 1/1970 | Holliday et al. | 424—230X |

SHEP K. ROSE, Primary Examiner

U.S. Cl. X.R.

424—274